Patented Oct. 21, 1930

1,778,975

UNITED STATES PATENT OFFICE

EDWARD C. HOLTON, OF OLMSTED FALLS, OHIO, ASSIGNOR TO THE SHERWIN-WILLIAMS COMPANY, OF CLEVELAND, OHIO, A CORPORATION OF OHIO

PIGMENT

No Drawing. Application filed October 19, 1927. Serial No. 227,348.

For many years it has been known that the titanium oxygen compound approximating that represented by the formula $TiO_2$ may be produced in the form of a white powder possessing valuable pigment properties.

It is only within recent years, however, that this valuable pigment has become commercially available, numerous processes having been developed for its production. Even now this material is rather costly in its concentrated form and it is marketed for the most part in combination with blanc fixe or calcium sulfate or other mineral extenders of little opacity in which the titanium oxygen compound is the minor part and the blanc fixe or other extender of little opacity is the major part. One of the principal objections to titanium paints as heretofore manufactured has been that the pigment tends to chalk off the painted surface, after a time, and various efforts have been made to overcome this difficulty.

Since it is often undesirable to have barium sulfate or other non-opaque extenders present in paint mixtures in which white lead and white zinc oxide are present, if one would use titanium white in such mixtures it is necessary to use this concentrated expensive form of titanium.

It is the object of this invention to make commercially available a compound pigment of high opacity containing zinc, lead, and titanium compounds uncontaminated with non-opaque extenders.

It is a further object of the invention to provide a paint material that will possess the beneficial effects to be derived from the relatively high opacity of titanium oxide and yet be substantially free of any tendency for the pigment to chalk off the painted surface.

In practicing my invention I find it desirable to use the most economical lead zinc pigments available, in order that the product may be low in cost as well as high in desirable pigment properties.

The zinc-lead pigments which are made from mixed zinc-lead ores by a commonly used fume process offer the greatest advantage and therefore I prefer to use these although I do not wish to limit myself to their use.

Having described the aim of my invention I will now describe methods for its operation.

The zinc-lead fume pigments obtained from zinc-lead ores are recovered from the filter bags in the bag house in the usual manner. These zinc-lead fume pigments ordinarily are conveyed directly to the packing house where they are packed in bags or barrels or they may be refined by dry processes of air flotation or screening or by a wet process of washing with water followed by filtration, drying, grinding, air flotation, etc.

When only the dry process of refining is employed I introduce powdered titanium oxygen compound into the zinc-lead pigments and mix them thoroughly before they go to the air flotation or screening plant. When the wet process of refining is being employed I introduce the titanium oxygen compound into the washing tanks along with the zinc-lead pigments and the water. Thus in a very simple yet effective manner I am able to produce a commercial pigment consisting of titanium white and zinc-lead white possessing high opacity and other desirable pigment properties. Fumed zinc-lead white of itself possesses a high opacity, thereby differing greatly from blanc fixe, barytes, calcium sulfate and other extenders and by the addition of the titanium oxygen compound in this manner any degree of opacity, ranging from that of the fumed zinc-lead pigment alone up to that of the titanium oxygen pigment alone, may be obtained.

In carrying out my invention the proportions of the zinc-lead pigment and titanium oxygen compound may be widely varied but in most cases the major part of the mixture will be the zinc-lead pigment and the minor part the titanium oxygen compound as I am limited only by the permissible maximum cost of the final product and the minimum opacity required. The preferred proportions are those in which the combined metal equivalent of the three elements lead, zinc and titanium, is approximately 65% and in which the percentage content of any of these three elements may vary from 5% to 55%.

Having thus described my invention, what I claim is:

1. A white pigment consisting of an intimate and uniform mixture of a zinc-lead pigment and a titanium oxygen compound.

2. A white pigment consisting of an intimate and uniform mixture the major part of which is a zinc-lead fume pigment and the minor part a titanium oxygen compound.

3. A white pigment consisting of an intimate and uniform mixture of a zinc-lead fume pigment and a titanium oxygen compound and substantially free from other substances having less opacity than the zinc-lead pigment.

In testimony whereof, I hereunto affix my signature.

EDWARD C. HOLTON.